United States Patent
Hittorff et al.

(10) Patent No.: US 9,707,702 B2
(45) Date of Patent: Jul. 18, 2017

(54) DRYING-/DEGASSING DEVICE AND ALSO DEVICE AND METHOD FOR THE DIRECT PRODUCTION OF MOULDED ARTICLES FROM POLYESTER MELTS

(71) Applicant: UHDE INVENTA-FISCHER GMBH, Berlin (DE)

(72) Inventors: Martin Hittorff, Bonaduz (CH); Heinrich Koch, Kleinmachnow (DE)

(73) Assignee: UHDE INVENTA-FISCHER GMBH, Berlin (DE)

( * ) Notice: Subject to any disclaimer, the term of this patent is extended or adjusted under 35 U.S.C. 154(b) by 532 days.

(21) Appl. No.: 14/345,560

(22) PCT Filed: Sep. 18, 2012

(86) PCT No.: PCT/EP2012/068309
§ 371 (c)(1),
(2) Date: Mar. 18, 2014

(87) PCT Pub. No.: WO2013/053571
PCT Pub. Date: Apr. 18, 2013

(65) Prior Publication Data
US 2014/0353871 A1    Dec. 4, 2014

(30) Foreign Application Priority Data
Sep. 19, 2011  (EP) ..................................... 11007616

(51) Int. Cl.
*B29B 9/08* (2006.01)
*B29B 9/16* (2006.01)
(Continued)

(52) U.S. Cl.
CPC .................. *B29B 9/08* (2013.01); *B29B 9/10* (2013.01); *B29B 9/12* (2013.01); *B29B 9/16* (2013.01);
(Continued)

(58) Field of Classification Search
None
See application file for complete search history.

(56) References Cited

U.S. PATENT DOCUMENTS

| 4,064,112 | A | 12/1977 | Rothe et al. |
| 5,292,865 | A | 3/1994 | Kerpes et al. |

(Continued)

FOREIGN PATENT DOCUMENTS

| CN | 1402663 A | 3/2003 |
| CN | 101842208 A | 9/2010 |

(Continued)

OTHER PUBLICATIONS

European Patent Office, International Search Report in International Application No. PCT/EP2012/068309 (Nov. 20, 2012).

(Continued)

*Primary Examiner* — Monica Huson
(74) *Attorney, Agent, or Firm* — Leydig, Voit & Mayer, Ltd.

(57) ABSTRACT

The present invention relates to a drying-/degassing device (7) for drying or degassing a polyester granulate, which has a temperature-control zone, a cooling zone, an inlet (6) and an outlet (6) for polyester granulate and also in addition a separate removal possibility (14) for removing hot polyester granulate. In addition, the present invention relates to a device for the direct production of molded articles from polyester melts which comprises the drying-/degassing device according to the invention. In addition, the present invention describes a method for the production of molded articles from polyesters.

16 Claims, 5 Drawing Sheets

(51) Int. Cl.

| | | |
|---|---|---|
| *B29B 13/06* | (2006.01) | |
| *B29B 9/10* | (2006.01) | |
| *B29B 9/12* | (2006.01) | |
| *B29C 35/16* | (2006.01) | |
| *B29C 43/00* | (2006.01) | |
| *C08G 63/90* | (2006.01) | |
| *B29K 67/00* | (2006.01) | |
| *F26B 17/14* | (2006.01) | |
| *B29B 9/06* | (2006.01) | |

(52) U.S. Cl.
CPC ............ *B29B 13/06* (2013.01); *B29B 13/065* (2013.01); *B29C 35/16* (2013.01); *B29C 43/003* (2013.01); *B29C 43/006* (2013.01); *C08G 63/90* (2013.01); *B29B 9/065* (2013.01); *B29K 2067/00* (2013.01); *F26B 17/14* (2013.01)

(56) References Cited

U.S. PATENT DOCUMENTS

| | | | |
|---|---|---|---|
| 6,592,350 B1 * | 7/2003 | Chszaniecki | ............ B29B 9/06 425/311 |
| 6,754,979 B2 | 6/2004 | Ludwig et al. | |
| 7,674,878 B2 | 3/2010 | Hanimann et al. | |
| 7,993,557 B2 | 8/2011 | Hanimann et al. | |
| 8,556,610 B2 | 10/2013 | Hanimann et al. | |
| 2003/0000100 A1 | 1/2003 | Ludwig et al. | |
| 2005/0085620 A1 | 4/2005 | Bruckmann | |
| 2005/0215753 A1 | 9/2005 | Otto et al. | |
| 2007/0248778 A1 | 10/2007 | Kezios et al. | |
| 2009/0072423 A1 | 3/2009 | Hanimann et al. | |
| 2009/0292101 A1 | 11/2009 | Fellinger | |
| 2011/0293762 A1 | 12/2011 | Hanimann et al. | |
| 2013/0127079 A1 | 5/2013 | Hanimann et al. | |

FOREIGN PATENT DOCUMENTS

| | | |
|---|---|---|
| DE | 30 15 390 A1 | 10/1981 |
| DE | 10 2004 015515 A1 | 9/2004 |
| DE | 103 49 016 A1 | 6/2005 |
| DE | 10 2006 013 062 A1 | 9/2007 |
| DE | 10 2007 040 135 A1 | 2/2009 |
| EP | 1 608 696 B1 | 6/2006 |
| JP | H03-113282 A | 5/1991 |
| JP | H04-244588 A | 9/1992 |
| JP | 2000-043143 A | 2/2000 |
| WO | WO 2005/035608 A2 | 4/2005 |
| WO | WO 2006/006030 A1 | 1/2006 |
| WO | WO 2006/133469 A1 | 12/2006 |
| WO | WO 2009/027064 A1 | 3/2009 |

OTHER PUBLICATIONS

State Intellectual Property Office of the People's Republic of China, First Notification of Office Action in Chinese Patent Application No. 201280045509.7 (Aug. 24, 2015).

* cited by examiner

DRYING-/DEGASSING DEVICE AND ALSO DEVICE AND METHOD FOR THE DIRECT PRODUCTION OF MOULDED ARTICLES FROM POLYESTER MELTS

CROSS-REFERENCE TO RELATED APPLICATIONS

This patent application is the U.S. national phase of International Application No. PCT/EP2012/068309, filed on Sep. 18, 2012, which claims the benefit of European patent application No. 11007616.3, filed Sep. 19, 2011, the disclosures of which are incorporated by reference.

The present invention relates to a drying-/degassing device for drying or degassing a polyester granulate, which has a temperature-control zone, a cooling zone, an inlet and an outlet for polyester granulate and also in addition a separate removal possibility for removing hot polyester granulate. In addition, the present invention relates to a device for the direct production of moulded articles from polyester melts which comprises the drying-/degassing device according to the invention. In addition, the present invention describes a method for the production of moulded articles from polyesters.

In U.S. Pat. No. 4,064,112, the thermal damage which arose earlier during melt condensation at an intrinsic viscosity of more than 0.7 dl/g is described. For this reason, the widely used method of a solid-phase postcondensation in an inert gas flow in the shaft reactor at approx. 220° C. is used at present. It is also described how the residual water from the granulation or water absorbed by the polyester due to hygroscopy must be removed. For this purpose, drying is implemented before the solid-phase postcondensation. Furthermore, it is described how the adhesion arising during heating must be avoided by movement during the crystallisation. U.S. Pat. No. 4,064,112 also describes the removal of highly volatile by-products in a solid-phase postcondensation (dealdehydisation).

In EP 1 608 696, latent heat crystallisation is described. In the case of this method, the granulate is only cooled until, after removal of the cooling water with an agitated centrifuge, the inherent heat remaining in the core can be used directly for crystallisation. The objective is to avoid adhesions with a vibrating channel connected subsequent to the agitated centrifuge. The method serves for the purpose of achieving a sought degree of crystallisation for further processing. It was shown later that, even without a vibrating bed, no adhesions occur (cf. patent specification DE 103 49 016 with the subsequent unexamined German application DE 10 2006 013 062).

In a further step for process intensification, a method is presented in WO 2006/06030 in which a high intrinsic viscosity is achieved in a melt polycondensation, a small content of acetaldehyde being achieved by skilled process management. Hence, bottle granulate could be produced for the first time on an industrial scale without solid-phase postcondensation. For this so-called "melt-to-resin" method (MTR®), latent heat granulation was used. The inherent heat remaining in the granulate and the generated crystallisation heat was used directly for the first time for reducing the acetaldehyde content by a thermal treatment with air at 175° C. An increase in viscosity was not sought.

In U.S. Pat. No. 7,674,878, a latent heat granulation method is described, in which a non-adhering granulate is made available for further processing at a controlled temperature level by means of shock-cooling.

A reduction in viscosity due to moisture after the agitated centrifuge in the above-described MTR® method must be avoided. The result of a further development is stressed in WO 2009/027 064. Therein, an improved agitated centrifuge is presented, which is distinguished by a tangential entry of the granulate-water mixture into the agitated centrifuge. The diameter of the agitated centrifuge is widened towards the top. After the main dewatering in the lower part, the residual water is centrifuged off with an increased diameter. The vapour removal is assisted by centrally fed air. Also at the granulate outlet and in the following silos, dry air is introduced in counterflow in order to avoid entrainment of moisture into the thermal further processing (dealdehydisation). A reduction in viscosity due to hydrolysis can thus be extensively avoided.

In U.S. Pat. No. 5,292,865, essential elements of a method having melt polycondensation and dealdehydisation are described. The treatment with dry air and a thereby produced viscosity increase at 170 to 185° C. with a treatment time of 10 to 12 hours are stressed. In addition, a latent heat crystallisation method is described, in which the problematic adhesion with other crystallisation methods does not occur. The presentation of a temperature-controlled latent heat crystallisation, which is crucial for industrial use and which also allows an optimal operating window even for a small grain for the dealdehydisation, is however not described in this patent. According to this method, the granulate must be dried in a very complex manner in order that a viscosity increase, which outweighs the viscosity decrease due to hydrolysis, takes place.

In US 2007/0248778 A1, a method for the production of PET pellets and in addition for the production of PET preforms and PET bottles is described, which is distinguished by a low viscosity reduction in the method steps of pellet drying and preform production.

In the unexamined German application DE 10 2004 015 515 A1, the latent heat crystallisation of polyester and the particular properties of the polyester pellets is described with respect to the degree of crystallisation, the size distribution of crystal spherolites via a section through a polyester pellet and the melting energy of the polyester pellets. Three variants are thereby described:
- Transfer of pellets without additivation and without cooling from the granulate production to a solid-phase postcondensation reactor;
- Transfer of pellets without additivation into a dealdehydisation step under a nitrogen atmosphere;
- Transfer of the polymer melt with additivation in order to reduce the acetaldehyde content, and direct further processing to form preforms.

In WO 2005/035608 A2, the conventional polycondensation of polyester with the production of PET pellets in a strand granulation process is presented. In contrast to conventional methods, the PET pellets are cooled to approx. 70° C., instead of to 20 to 30° C. In every case, the PET pellets are cooled to a temperature below the glass transition point (76° C.). The PET pellets are subjected to a conventional solid-phase postcondensation reaction.

Various economic and qualitative disadvantages must be ascribed to the established methods:

1. Energy—and investment cost for cooling polyester pellets

After conclusion of the pellet conditioning or after conclusion of the solid-phase postcondensation, the polyester pellets must be cooled to a temperature which allows contact with polyethylene, without the material of the drum being destroyed. In order to cool the polyester pellets, there is a need for considerable outlay in apparatus and the cooling increases the operating costs for the production of the polyester pellets.

2. Energy—and investment cost for the crystallisation and drying of the polyester pellets The pre-product in the form of a granulate must be dried and heated. The product thereby crystallises and complex, mechanically moving intermediate steps must be provided in order to prevent adhesion of the granulate grains triggered during crystallisation. Treatment in fluidised beds leads to dust formation and demands corresponding filter plants for stable operation. For crystallisation and drying of the polyester pellets, there is a need for considerable outlay in apparatus and the cooling increases the operating costs for the production of the polyester preforms.

3. Thermooxidative damage to the polyester pellets in the crystallisation/drying Even at the relatively low temperature in the crystallisation/drying, the polyester pellets are damaged upon contact with air oxygen, which leads to impairment in the colour (b* value).

Starting herefrom, it is the object of the present invention to provide devices or methods with which the previously mentioned disadvantages of the state of the art can be avoided.

This object is achieved by the features of the drying-/degassing device for the direct production of moulded articles from polyester melts and the method for the production of moulded articles from polyesters described herein, and the advantageous developments thereof.

According to the invention, a drying-/degassing device for drying and/or degassing a polyester granulate is hence indicated, the drying-/degassing device a) being configured, in one part, as a container, preferably as a vertically standing cylindrical container having a temperature-control zone disposed in the upper part and a cooling zone disposed in the lower part, or b) being configured in two parts, as a container, preferably as a vertically standing cylindrical container for temperature-control and a separate subsequent cooling zone, the cooling zone being connected via a connection pipe to the container for the temperature-control, the temperature-control zone or the container for temperature-control having an inlet, disposed at the top-side, for the polyester granulate and the cooling zone having an outlet, disposed at the bottom-side, for the polyester granulate, and the drying-/degassing device having in addition at least one removal possibility for the removal of temperature-controlled polyester granulate from the temperature-control zone.

The present invention hence relates to the direct supply of polyester pellets to one or more preform machines in combination with a latent heat granulation and a pellet conditioning silo.

The characterising element of the invention is that a partial flow of polyester pellets at high temperature is transported from the conditioning silo to the preform machines. As a result, cooling in the lower part of the conditioning silo and drying of the pellets, for the partial flow of the polyester pellets, can be omitted as pretreatment before the actual process of preform production. Both process steps, both the cooling of the polyester pellets from the conditioning temperature to the required temperature for further processing and the crystallisation and drying of the pellets as pretreatment before the preform production, are energy-intensive process steps. Hence, a significant saving in energy can be achieved as a result of the invention.

There is meant by the term which is used here "polyester", in addition to polyethylene terephthalate, also the related copolymers, in the production of which a part of the monomers (ethylene glycol and terephthalic acid) are replaced by other diols or dicarboxylic acids.

There is understood here by latent heat crystallisation, underwater granulation in which the granulate is retained at a high temperature level due to a very short contact with water (shock-cooling). The water is separated rapidly in an agitated centrifuge and the residual water is evaporated above all by the heat flowing subsequently out of the core. Despite immediately beginning crystallisation, no adhesions arise and the granulate can be further processed thermally directly to form the product without additional heat introduction thanks to inherent heat. The occurring crystallisation heat helps in addition to increase the temperature.

The intrinsic viscosity (IV) is used here as characteristic value for the molecular weight. Higher IV and hence longer molecules represent higher strength. Since various viscosity-measuring methods are used in the technical field, the intrinsic viscosity, measured according to the ASTM method, is always used here (IV according to ASTM).

Polyester is produced in a melt phase at preferably 275 to 300° C. end temperature under vacuum. The product is used directly as melt or processed to form granulate and thus made available for further processing via a melt extruder. According to use, different quality requirements are imposed, above all with respect to the IV.

For further processing to form bottles, higher strengths are demanded than in the synthetic fibre industry. The additionally desired viscosity increase can be effected in an extended polycondensation in the melt phase itself or in a solid-phase postcondensation. In the case of solid-phase postcondensation, a granulate is dried again and heated and then polycondensed in a vacuum or in a gas flow at temperatures of preferably 200 to 225° C. Vacuum or a gas flow are required for reaction progress in order to discharge the resulting by-products (ethylene glycol, water).

In the case of both methods, both in the case of extended polycondensation in the melt phase itself and in the solid phase postcondensation, the polyester pellets are cooled at the end of the process and subsequently filled into polyethylene sacks or containers with polyethylene internal liners. The subsequent method step is the production of so-called "preforms" in an "injection moulding machine". If the preform machine is not installed at the same place as the polycondensation plant, the polyester pellets are brought by land, sea or train transport to the installation location of the preform machines.

Since polyester pellets have hydroscopic properties, crystallisation and drying is required before the preform production in order to reduce the water content to below 30 ppm. The drying is effected preferably at a temperature between 160 and 180° C. with a dwell time of preferably 6 to 10 hours with dry air. Without pre-drying, the water contained in the polyester pellets would lead to hydrolytic decomposition of the polymer chains and hence to a reduction in IV.

The preconditions for direct supply of polyester pellets to one or more preform machines and the production of the above-mentioned advantages are the following:

Installation of conditioning silo and preform machines in the same plant so that transport of polyester pellets at high temperature can be effected with a conveyor system.

Suitable devices for removal of a partial flow of polyester pellets from the conditioning silo above the cooler in the case of polycondensation in the melt phase itself. In particular, the main flow of polyester pellets in the conditioning silo must not be disturbed.

The devices for removal of a partial flow of polyester pellets must avoid the formation of zones (dead zones) which are not flowed through adequately in any case.

Suitable devices for the transport of polyester pellets at constantly high temperature from the conditioning silo to the preform machines.

The drying-/degassing device according to the invention is suitable for providing either drying of water-containing polyester granulate or the removal of volatile substances from the polyester granulate (degassing). Likewise, drying and degassing of the introduced polyester granulate can be undertaken at the same time with the drying-/degassing device. The device according to the invention is orientated preferably in the form of a vertically standing, cylindrical container, in one or two parts.

The drying-/degassing device according to the invention thereby has a temperature-control zone and a cooling zone. The temperature-control zone is thereby fitted vertically above the cooling zone. In one embodiment, the drying-/degassing device is configured as a cylindrical container, the upper region of which corresponds to the temperature-control zone and the lower region of which corresponds to the cooling zone; it is likewise possible to configure the drying-/degassing device in two parts, the temperature-control zone being connected via a connection pipe to the cooling zone which is disposed thereunder. Both zones represent containers into which polyester granulate can be introduced. The throughflow direction of the drying-/degassing device according to the invention is thereby from the top to the bottom, i.e. the temperature-control zone is provided, at the top-side, with an inlet for polyester granulate whilst the cooling zone comprises an outlet disposed at the bottom-side.

According to the invention, it is provided that the drying-/degassing device has in addition to the bottom-side outlet, a further removal possibility for the removal of temperature-controlled polyester granulate from the temperature-control zone. Hence, the drying-/degassing device according to the invention enables division of the polyester granulate introduced into the drying-/degassing device into the temperature-control zone in two partial flows, one partial flow being able to be removed via the cooling zone and another partial flow via the temperature-control zone.

In the cooling zone, cooling of the polyester granulate is effected, for example, to ambient temperature, so that, directly subsequently, packing, batch-wise packing or storage of the polyester granulate, for example in a silo, is possible. The temperature-control zone is preferably filled with hot polyester granulate, the temperature of the introduced polyester granulate is for example between 50° C. and 250° C. However, the polyester granulate which is fed into the drying-/degassing device according to the invention can also assume temperatures which are between these corner points.

It is thereby possible that the temperature-control zone merely represents a container in which the polyester granulate passes through from top to bottom as a result of gravity. However, it is also likewise possible that the temperature-control zone is insulated relative to the environment, however it is also possible, alternatively or additionally hereto, that the temperature-control zone has heating elements with which the polyester granulate located in the temperature-control zone can be maintained at a prescribed temperature or can be heated to a prescribed temperature.

In addition, it is possible that the temperature-control zone or the cooling zone or both zones have active mixing elements, such as for example agitators or screws, etc., or passive mixing elements, as a result of which evening-out of the temperature-control of the introduced polyester granulate can be maintained.

The invention offers the following advantages:

Energy saving as a result of the fact that the cooling of a partial flow of polyester pellets can be omitted, saving in investment costs as a result of the fact that the cooling of a partial flow of polyester pellets can be omitted or the cooler can be designed to be smaller, energy savings as a result of the fact that the crystallisation/drying of the polyester pellets before the preform machines can be omitted or the duration of the crystallisation/drying can be considerably reduced, saving in investment costs as a result of the fact that the crystallisation/drying of the polyester pellets before the preform machines can be omitted or can be dimensioned to be considerably smaller, improvement in the quality of the polyester pellets since the thermooxidative damage to the polyester pellets due to the crystallisation/drying before the preform machines can be omitted or the damage turns out to be less, improvement in the economic efficiency of the overall process due to integration of the polyester pellet- and preform production.

A preferred embodiment provides that the at least one removal possibility for removal of temperature-controlled, i.e. hot polyester granulate, from the temperature-control zone, is formed by a) at least one outflow pipe disposed in the throughflow direction in front of the cooling zone, which outflow pipe is connected via the wall of the cylindrical container to the interior of the temperature-control zone of the cylindrical container, b) at least one, two or more pipes, preferably double-walled pipes which, starting from the temperature-control zone, are guided through the cooling zone, c) at least one annular gap which is configured vertically passing through the cooling zone and which enables guidance of the polyester pellets from the temperature-control zone through the cooling zone, d) at least one conveyor screw which is disposed in the throughflow direction in front of the cooling zone and is connected via the wall of the cylindrical container to the interior of the temperature-control zone of the cylindrical container, e) at least one outflow pipe which is connected to the connection pipe, or f) combinations of the previously mentioned possibilities.

The removal possibility can hence be produced by various advantageous alternative embodiments.

The above-mentioned first alternative a) provides that at least one outflow pipe in the throughflow direction, i.e. from the top to the bottom, with respect to the drying-/degassing device, is disposed in front of the cooling zone and is guided through the wall of the cylindrical container of the temperature-control zone. This outflow pipe can end for example flush with the inside of the wall of the cylindrical container of the temperature-control zone, but can also protrude beyond the wall into the interior of the temperature-control zone and be guided for example such that it has an upwardly protruding opening so that a partial flow can be removed specifically from the temperature-control zone. This preferred embodiment is suitable both for an above-described drying-/degassing device, which is configured in one-part, and for a drying-/degassing device, which is configured in two-parts.

The second above-mentioned alternative b) provides that at least one, two or more pipes which are configured preferably as double-walled pipes, starting from the cylindrical container of the temperature-control zone, are guided through the cooling zone. This embodiment can provide for example that these pipes start from the bottom of the cylindrical container of the temperature-control zone and are guided through the cooling zone going from the top to the bottom. This embodiment is suitable in particular for the above-described drying-/degassing device, which is configured in one part, and for the drying-/degassing device, which is configured in two parts.

According to the above-indicated third alternative embodiment c) of the removal possibility, it is possible that this is formed by an annular gap. In the case of this embodiment, annular cavities which correspond in the cylindrical container to the temperature-control zone are introduced in the bottom. The limits of the annular gap, i.e. the walls of the annular gap, are thereby guided through the cooling zone. The guiding-through can be effected for example vertically from the top to the bottom so that, at the bottom of the cooling zone, an annular gap-shaped outlet opening likewise results, at which the hot polyester granulate can be collected again. Likewise, it is also possible that the annular gap is guided at an angle relative to the vertical, i.e. has a diagonal bottom wall so that the hot polyester pellets can be collected at one side. This preferred embodiment is suitable both for the above-mentioned one-part and two-part embodiment of the drying-/degassing device according to the invention.

The fourth preferred embodiment d) of the removal possibility provides that the removal possibility has an active configuration, i.e. has a means which enables active removal of the polyester pellets from the temperature-control zone. This active removal possibility can be configured for example as a conveyor screw which is guided through the wall of the cylindrical container of the temperature-control zone. This embodiment is also suitable both for the above-mentioned one-part and two-part embodiment of the drying-/degassing device according to the invention.

In the case where the drying-/degassing device according to the invention has a two-part configuration, i.e. the temperature-control zone and the cooling zone are separated by a connection pipe, the preferred embodiment e) indicated further back provides that the removal possibility is formed by an outflow pipe which is in fluidic connection to the connection pipe. Here also, it can be preferred that the outflow pipe is sealed flush with the inner wall of the connection pipe, however it can likewise be provided that the outflow pipe is guided through the wall of the connection pipe and protrudes into the interior of the connection pipe. Here also, the opening of the outflow pipe can for example be configured to protrude upwards into the connection pipe.

In addition, the production according to the invention of the removal possibility is not restricted to a single one of the above-mentioned removal possibilities, rather also combinations of the above-mentioned possibilities can be suitable for producing a drying-/degassing device according to the invention.

A further preferred embodiment provides that the removal possibilities are insulated thermally. The above-mentioned components of the removal possibility, in particular the outflow pipes, the double-walled pipes, the annular gaps (for example above the walls) or the housing of the conveyor screw, can be thermally insulated.

In the case where a plurality of removal possibilities is provided for discharge of hot polyester granulate out of the cylindrical container of the temperature-control zone, it is advantageous in addition if these removal possibilities are combined after emergence or discharge of the polyester granulate from the temperature-control zone and are supplied to a single pipeline.

Furthermore, it is preferred if the drying-/degassing device has a possibility for guiding gases through in counterflow to the polyester granulate.

According to the invention, a device for the direct production of moulded articles from polyester melts is provided in addition, which device comprises at least the following components:
a) an underwater granulator for producing polyester granulate from a polyester melt,
b) a device, which is connected after the underwater granulator, for separating the polyester granulate, produced by the underwater granulator, from the water,
c) connected after the device for separating the polyester granulate, an above-described drying-/degassing device according to the invention for drying and/or degassing the polyester granulate,
d) a transport device for removing the polyester granulate from the drying-/degassing device, the transport device being connected to the removal possibility of the drying-/degassing device and serving for the supply of the granulate to at least one
e) moulding tool for the production of moulded articles from the granulate.

The device according to the invention hence enables the direct production of polyester moulded articles beginning with polyester melts. These polyester melts can be obtained for example by melting already present granulate, however it is likewise possible to remove the polyester melts directly from a polycondensation reaction and to supply them to the underwater granulator.

The drying-/degassing device according to the invention enables the production of a highly-crystalline polyester granulate, the use of which has a positive effect in particular on the obtained moulded articles.

According to a further preferred embodiment, the device for separating the polyester granulate, produced by the underwater granulator, from the water, has an agitated centrifuge which has preferably a possibility for removing gases and/or volatile condensates by suction.

It is likewise possible that the transport device is configured as a pneumatic transport device or as a mechanical transport device, in particular as chain transport device or as conveyor screw.

A preferred embodiment of the moulding tool provides that this comprises a receiving silo, an extruder and also an injection moulding tool.

Furthermore, a method for the production of moulded articles from polyesters is likewise indicated according to the present invention, in which
a) a polyester melt is granulated by means of an underwater granulator,
b) the granulate is separated from the cooling water, and also
c) is dried/degassed,
at least a part of the granulate which is dried/degassed and/or postcondensed in step c) being supplied without further cooling to at least one moulding tool and converted into a moulded article.

It is thereby preferred that the granulate is maintained, during step c), at a temperature of 100 to 200° C., preferably 140 to 190° C., particularly preferred of 160 to 180° C.

Furthermore, it is preferred according to the invention if the temperature of the polyester granulate is maintained, during supply to the moulding tool, at ±50° C., preferably ±30° C., particularly preferred ±15° C., relative to the granulate temperature during step c).

In particular, the method can be implemented with a device for the direct production of moulded articles from polyester melts which comprises the drying-/degassing device according to the invention, as described above.

A further preferred embodiment of the method according to the invention provides that the part of the polyester granulate, which is not supplied to the moulding tool, is cooled subsequent to step c).

Furthermore, it is preferred if the ratio of the granulate supplied to the moulding tool and of the cooled granulate is adjusted between 0.1 and 0.7, preferably between 0.3 and 0.5.

The present invention is explained in more detail with reference to the subsequently illustrated Figures without restricting the invention however to the special embodiments represented there.

BRIEF DESCRIPTION OF THE DRAWINGS

There are shown in the Figures

DETAILED DESCRIPTION OF THE INVENTION

Figure 1:
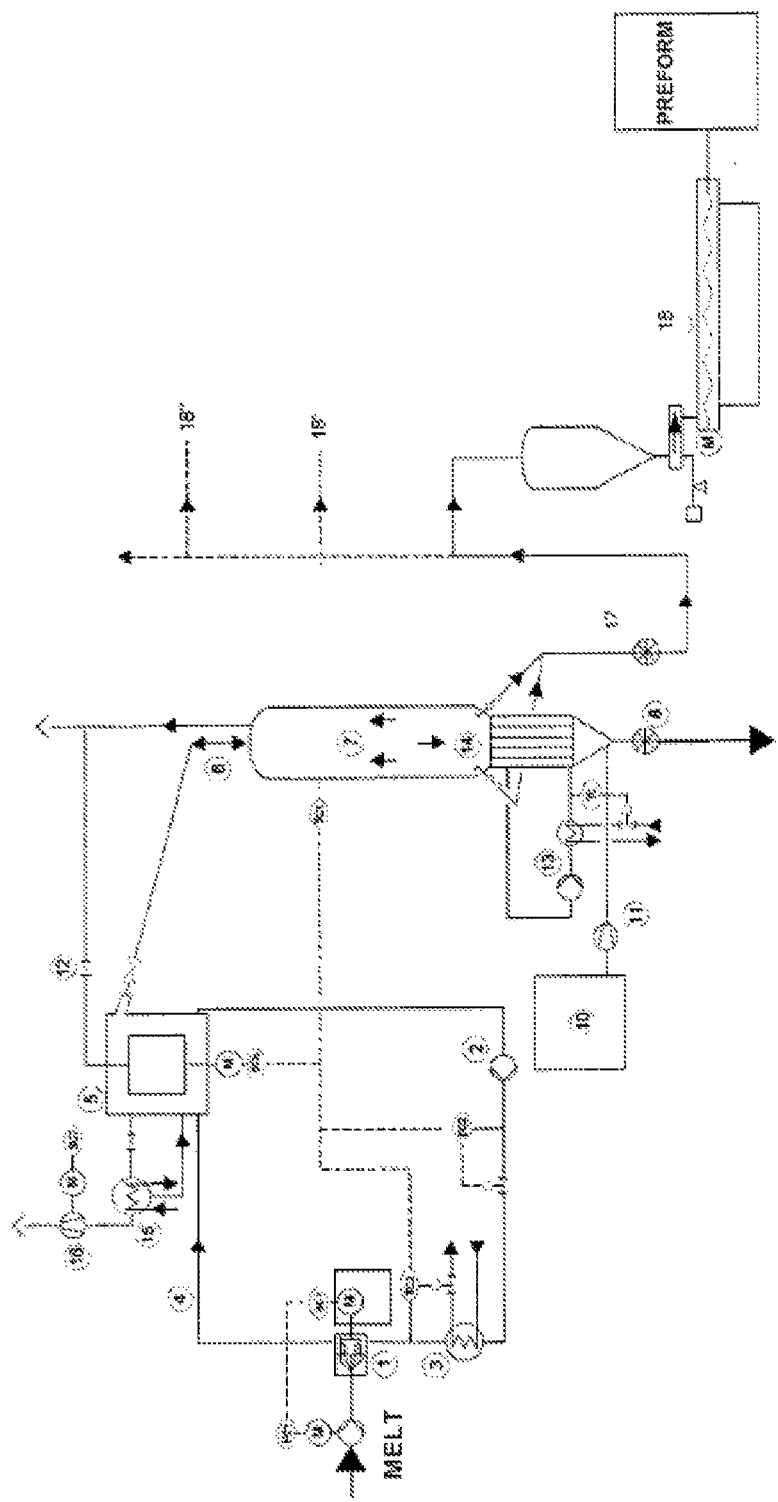
FIG. 1 a device according to the invention for the direct production of moulded articles from polyester melts having a drying-/degassing device according to the invention, the removal possibility of which is configured as a spigot above the pellet cooler, FIG. 2 a device according to the invention for the direct production of moulded articles from polyester melts having a drying-/degassing device according to the invention, in which the removal possibility is configured as a double-walled pipe guided through the pellet cooler, FIG. 3 a device according to the invention for the direct production of moulded articles from polyester melts having a drying-/degassing device according to the invention, in which the removal possibility is configured as an annular gap in the bottom of the temperature-control zone and is guided outwards partially through the cooler, FIG. 4 a device according to the invention for the direct production of moulded articles from polyester melts having a drying-/degassing device according to the invention, in which the removal possibility is configured as conveyor screw above the pellet cooler, and also FIG. 5 a device according to the invention for the direct production of moulded articles from polyester melts having a drying-/degassing device according to the invention which has a two-part configuration and in which the temperature-control zone is separated from the cooler and connected via a connection pipe, the removal possibility being configured in the connection pipe.

In FIG. 1, an apparatus for the production of moulded articles from polyester melts is represented, which comprises a drying-/degassing device 7 according to the invention. The drying-/degassing device 7 has a removal possibility 14 for removing a partial flow of polyester pellets at high temperature, which is guided via a transfer 17 to the preform machines 18, 18', 18". Removal 14 of the partial flow is effected above the cooler 12 at two or more places on the outer circumference of the drying-/degassing device 7. The removal places 14 open into an outflow pipe 17 which is disposed at an angle to the vertical.

The two or more removal places 14 are combined in a common pipeline 17 which is connected to a conveyor system 17a. The conveyor system 17a transports the polyester pellets at high temperature directly to the preform machines 18, 18', 18". One or more preform machines 18, 18', 18" can be supplied with polyester pellets at high temperature. The polyester pellets are fed, without crystallisation and drying, only with a low dwell time in the receiving container, directly to the preform machines 18, 18', 18".

The number of removal places is fixed according to the ratio between partial flow to the preform machines 18, 18', 18" and the main flow 8 to the pellet cooler.

Figure 2:
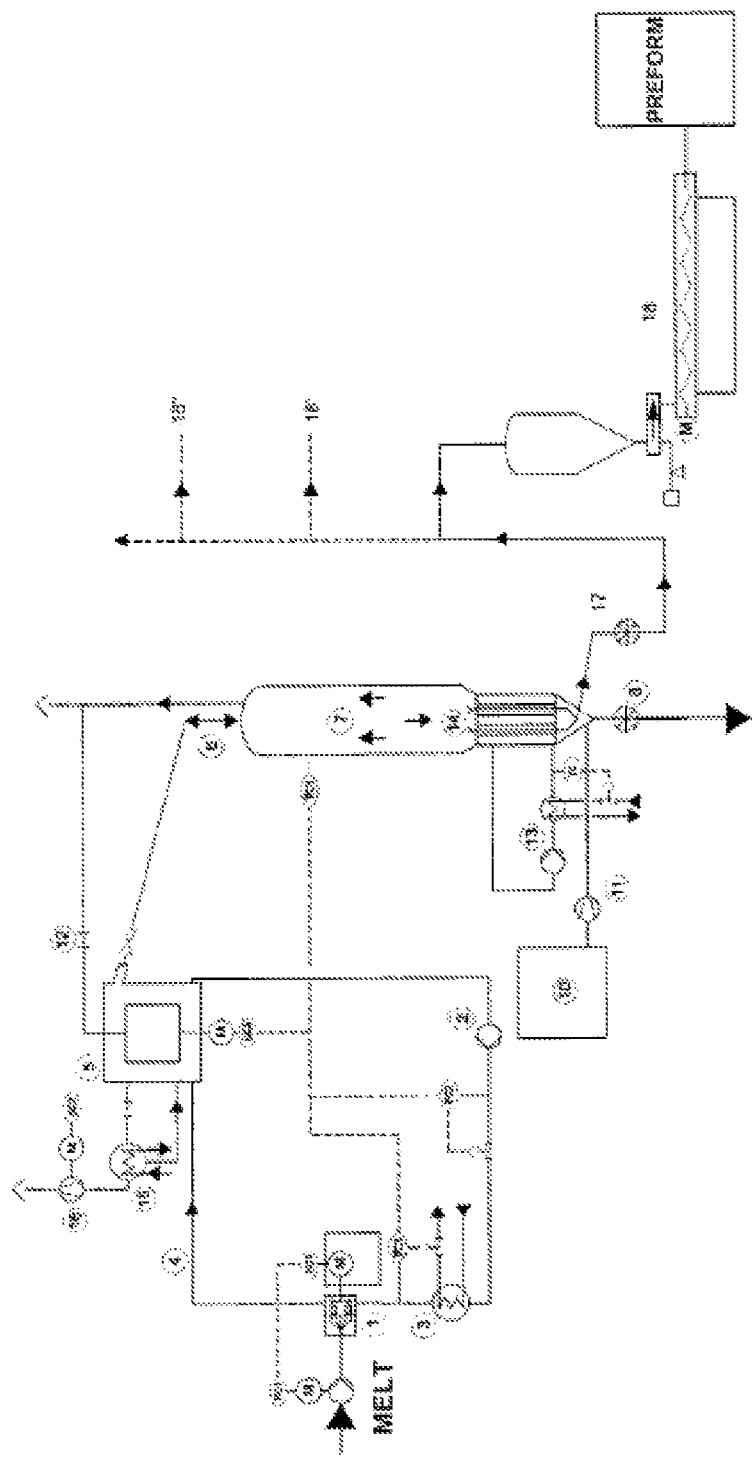
Figure 3:
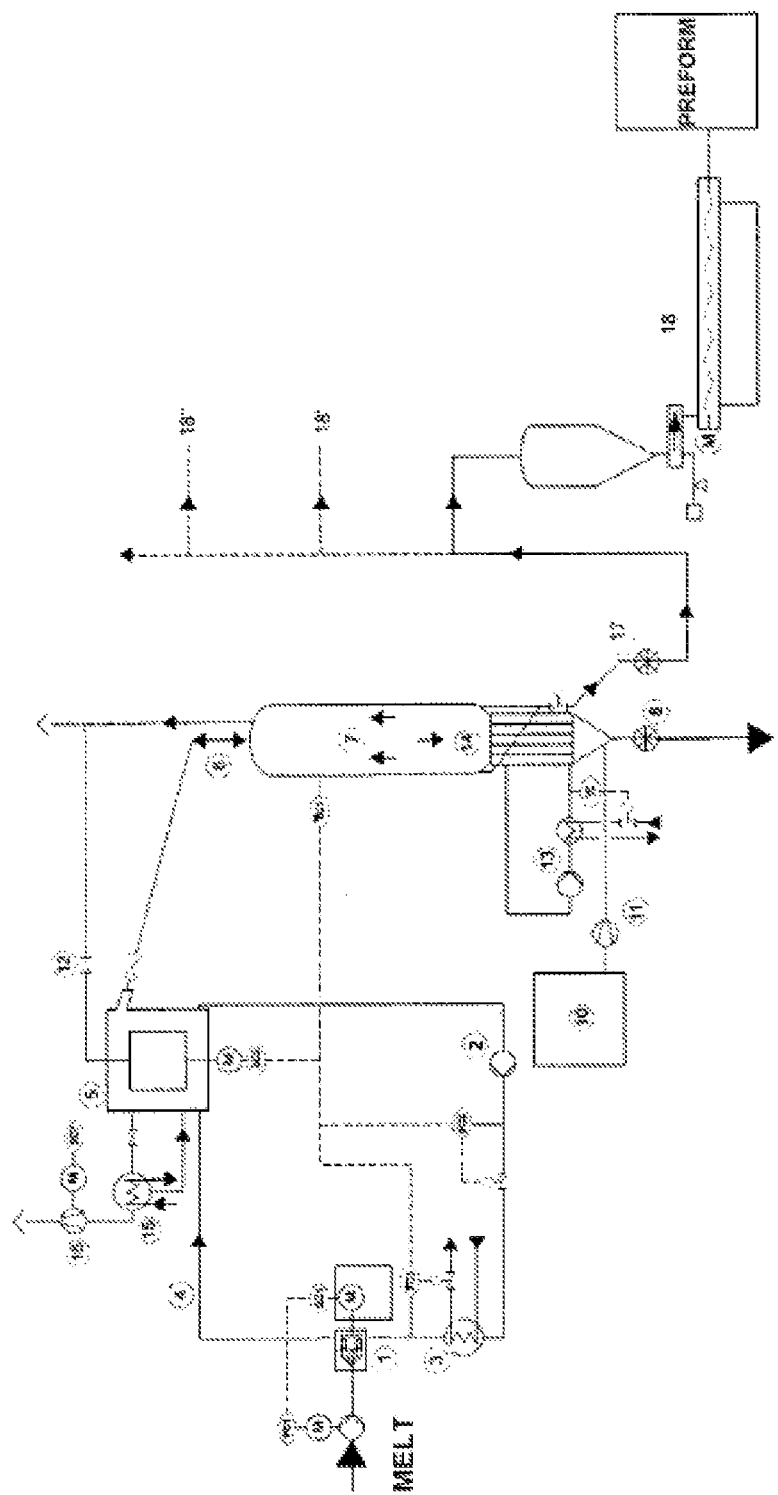
Figure 4:
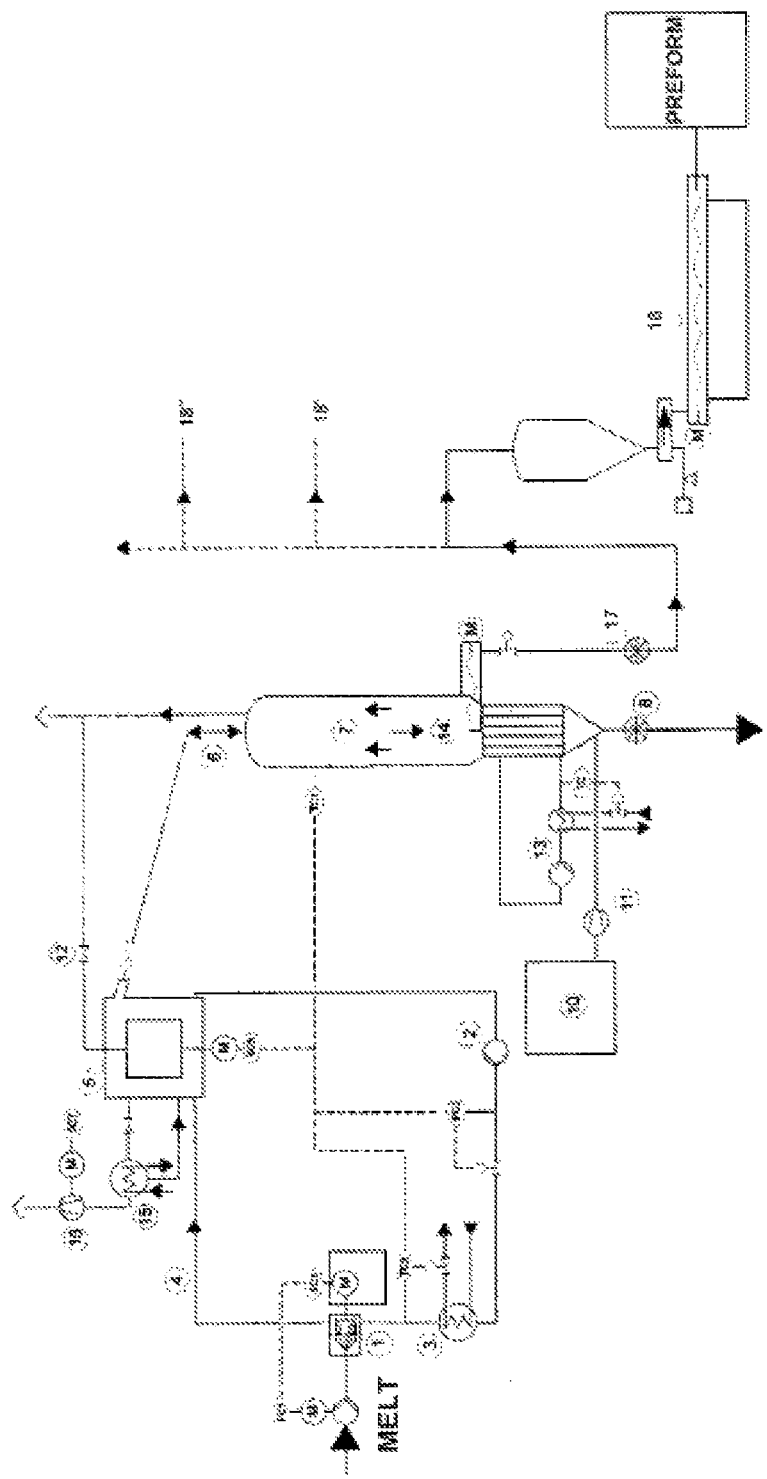

The drying-/degassing device 7 according to the invention thereby has a one-part configuration, i.e. a cooling device 13 extending vertically downwards is connected directly to the temperature-control zone (also termed conditioning silo). Also the drying-/degassing devices 7 in FIGS. 2 to 4 are configured in this way.

The device according to the invention for the production of moulded articles consists of the following main components which have the same configuration in all of the FIGS. 1 to 5.

(1) Underwater granulation:

A regulated quantity of polyester melt (FC1) is pressed via a suitable number of nozzles into a chamber through which water flows.

(2) Cooling water circulation:

The quantity of granulation water circulating through the circulation pump 2 is regulated in order that the correct dwell time is set in the cooling stretch 4.

(3) Cooling of the granulation water:

In addition to the dwell time in the cooling stretch, the water temperature regulated in the cooler 3 with (TC3) has a strong influence on the remaining residual heat.

(5) Agitated centrifuge->water removal:

In addition to the dwell time and the temperature in the cooling stretch, the remaining contact time between water and granulate grain in the agitated centrifuge 5 remains crucial for the residual heat in the granulate grain. With the regulatable speed of rotation of the rotor (SC5), the contact time of granulate with water can be adjusted optimally in the centrifuge.

(16) Removal by suction:

Fine drops and water vapour are withdrawn by the exhaust fan 16 as rapidly as possible through the sieve of the centrifuge, the water being extensively recovered via the condenser 15. The removal by suction is assisted by hot and dry gas from the thermal treatment 12.

(7) Drying-/degassing device:

The temperature of the thermal treatment is provided by the residual heat in the granulate and the crystallisation heat. The residual heat is controlled with the following process variables (TC1):

Granulate weight divided by the melt quantity (FC1) and granulator speed of rotation (SC1),
Contact time of water-granulate divided by the water quantity (FC2) and the speed in the cooling stretch 4 and also the speed of rotation of the agitated centrifuge (SC5),
Granulation water temperature (TC3),
Removal by suction (SC7) with assistance of the gas flows 6 and 12.

With the fan 11, air is conducted from the bottom to the top through the granulate bed which flows from top to bottom in a silo. The gas thereby absorbs highly-volatile by-products, such as water, ethylene glycol, acetaldehyde etc. At a temperature of more than 175° C., this leads to an increase in viscosity and a reduction in the AA content, i.e. to solid-phase postcondensation. With increasing temperature (TC1), both the viscosity increase and the AA reduction per unit of time are greater.

(10) Removal of moisture from the air: In the case of a thermal treatment with ambient air, this should have moisture removed (9).

(8) Further processing:

The granulate can be cooled in a cooler, which is integrated in the silo or connected thereafter for packaging, to the permissible temperature therefor.

(13) Cooler with water circulation for cooling the pellets:

The circulation water is re-cooled with cooling water.

(14) Removal device of the polyester pellets at high temperature above the cooler:

In the case of the configuration of the invention according to FIG. 1, this removal device is configured as a spigot. In the case of the configuration of the invention according to FIGS. 2 to 5, the design of the removal device in the respective portions is described.

(17) Transport device for polyester pellets at high temperature, consisting of pipeline and feeder.

(18) Preform machine including receiving silo, extruder and "injection moulding" machine. The number of preform machines is not limited, according to the capacity of the preform machines, between 1 and 20 machines (e.g. 18, 18', 18") can be supplied directly with polyester pellets at high temperature. The number and the size of the removal places 14 from the drying-/degassing device 7 according to the invention and also the capacity of the conveyor system 17 must be adapted to the overall capacity of the preform machines 18, 18', 18".

In FIG. 2, an apparatus for removal 14 of a partial flow of polyester pellets at high temperature from a conditioning silo 7 and transfer to the preform machines 18 is shown. Removal 14 of the partial flow is effected through two or more double-walled pipes which are guided through the cooler. The double-walled pipes can be equipped in addition with an insulating layer which reduces the temperature drop. The double-walled pipes open into a common outflow pipe which is connected to a conveyor system 17.

The conveyor system 17 transports the polyester pellets at high temperature directly to the preform machines 18. One or more 18, 18', 18" preform machines 18 can be supplied with polyester pellets at high temperature. The polyester pellets are fed, without crystallisation and drying, only with a low dwell time in the receiving container, directly to the preform machines 18, 18', 18".

The number of double-walled pipes is fixed according to the ratio between partial flow to the preform machines 18, 18', 18" and the main flow to the pellet cooler.

In FIG. 3, an apparatus for removal of a partial flow of polyester pellets at high temperature from a drying-/degassing device 7 according to the invention and transfer to the preform machines 18 is shown. Removal 14 of the partial flow is effected through a cylindrical annular gap which is connected to the interior of the drying-/degassing device 7 according to the invention by round or slot-shaped openings. The bottom of the annular gap cylinder is disposed at an angle relative to the vertical so that the polyester pellets are collected at one side. At the lowest position of the annular gap cylinder, an outlet pipe which is connected to a conveyor system 17 is disposed. The annular gap cylinder can be equipped in addition with an insulating layer which reduces the temperature drop.

The conveyor system 17 transports the polyester pellets at high temperature directly to the preform machines 18, 18', 18". One or more preform machines can be supplied with polyester pellets at high temperature. The polyester pellets are fed, without crystallisation and drying, only with a low dwell time in the receiving container, directly to the preform machines 18, 18', 18".

The number of openings between inner part and annular gap cylinder is fixed according to the ratio between partial flow to the preform machines 18, 18', 18" and the main flow to the pellet cooler.

In FIG. 4, an apparatus 14 for removal of a partial flow of polyester pellets at high temperature from a drying-/degassing device 7 according to the invention and transfer 17 to the preform machines 18, 18', 18" is shown. Removal of the partial flow is effected by an actuated conveyor screw. The exit of the conveyor screw is connected to the entry of the conveyor system with a pipeline.

The conveyor system 17 transports the polyester pellets at high temperature directly to the preform machines. One or more preform machines can be supplied with polyester pellets at high temperature. The polyester pellets are fed, without crystallisation and drying, only with a low dwell time in the storage container, directly to the preform machines 18, 18', 18".

The size and speed of rotation of the conveyor screw is fixed according to the ratio between partial flow to the preform machines 18, 18', 18" and the main flow to the pellet cooler.

Figure 5:
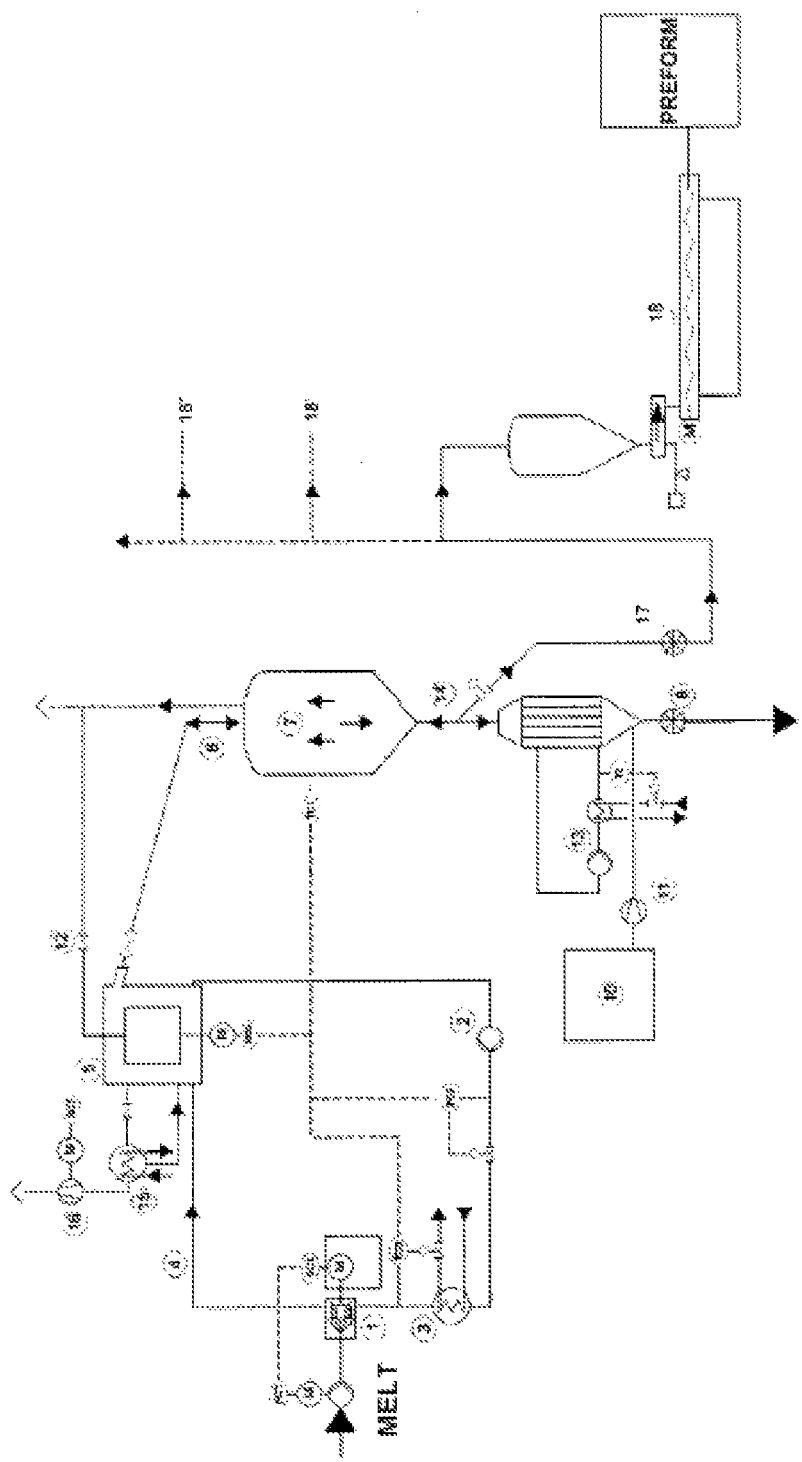

In FIG. 5, an apparatus 14 for removal of a partial flow of polyester pellets at high temperature from a drying-/degassing device 7 and transfer to the preform machines 18, 18', 18" is shown. The drying-/degassing device 7 according to the invention thereby has a two-part configuration, the pellet cooler being present separately from the conditioning silo. Between the cone of the conditioning silo and the pellet cooler, pellets at high temperature are removed via a forked pipe or a T-piece. The polyester pellets are supplied at high temperature to a conveyor system 17.

The conveyor system 17 transports the polyester pellets at high temperature directly to the preform machines 18, 18', 18". One or more preform machines 18, 18', 18" can be supplied with polyester pellets at high temperature. The polyester pellets are fed, without crystallisation and drying, only with a low dwell time in the receiving container, directly to the preform machines 18, 18', 18".

The transport output of the conveyor device determines the ratio between partial flow of the pellets to the preform machines 18, 18', 18" and the main flow to the pellet cooler.

The invention claimed is:

1. A method for the production of moulded articles from polyesters, wherein
    a) a polyester melt is granulated by means of an underwater granulator,
    b) the granulate is separated from the cooling water, and also
    c) is dried/degassed and/or postcondensed,
    wherein
    at least a part of the granulate which is dried/degassed and/or postcondensed in step c) is supplied without further cooling to at least one moulding tool and converted into a moulded article.

2. The method according to claim 1, wherein the granulate is maintained, during step c), at a temperature of 100 to 200° C.

3. The method according to claim 1, wherein the temperature of the polyester granulate is maintained, during supply to the moulding tool, at ±50° C., relative to the granulate temperature during step c).

4. The method according to claim 1, wherein the part of the polyester granulate, which is not supplied to the moulding tool, is cooled subsequent to step c).

5. The method according to claim 4, wherein the ratio of the granulate supplied to the moulding tool and of the cooled granulate is adjusted between 0.1 and 0.7.

6. The method according to claim 2, wherein the granulate is maintained, during step c), at a temperature of 140 to 190° C.

7. The method according to claim 2, wherein the temperature of the polyester granulate is maintained, during supply to the moulding tool, at ±50° C., relative to the granulate temperature during step c).

8. The method according to claim 2, wherein the part of the polyester granulate, which is not supplied to the moulding tool, is cooled subsequent to step c).

9. The method according to claim 1, wherein the temperature of the polyester granulate is maintained, during supply to the moulding tool, at ±30° C., relative to the granulate temperature during step c).

10. The method according to claim 2, wherein the temperature of the polyester granulate is maintained, during supply to the moulding tool, at ±30° C., relative to the granulate temperature during step c).

11. The method according to claim 3, wherein the temperature of the polyester granulate is maintained, during supply to the moulding tool, at ±30° C., relative to the granulate temperature during step c).

12. The method according to claim 1, wherein the temperature of the polyester granulate is maintained, during supply to the moulding tool, at ±15° C., relative to the granulate temperature during step c).

13. The method according to claim 2, wherein the temperature of the polyester granulate is maintained, during supply to the moulding tool, at ±15° C., relative to the granulate temperature during step c).

14. The method according to claim 3, wherein the temperature of the polyester granulate is maintained, during supply to the moulding tool, at ±15° C., relative to the granulate temperature during step c).

15. The method according to claim 5, wherein the ratio of the granulate supplied to the moulding tool and of the cooled granulate is adjusted between 0.3 and 0.5.

16. The method according to claim 2, wherein the granulate is maintained, during step c), at a temperature of 160 to 180° C.

* * * * *